March 6, 1945. E. A. GLYNN 2,370,655
TREAD VULCANIZING MOLD FOR TIRES
Filed March 9, 1943 3 Sheets-Sheet 1

INVENTOR
Edwin A. Glynn
BY
ATTORNEYS

March 6, 1945.   E. A. GLYNN   2,370,655
TREAD VULCANIZING MOLD FOR TIRES
Filed March 9, 1943   3 Sheets-Sheet 2

INVENTOR
Edwin A. Glynn
BY
ATTORNEYS

March 6, 1945. E. A. GLYNN 2,370,655
TREAD VULCANIZING MOLD FOR TIRES
Filed March 9, 1943 3 Sheets-Sheet 3
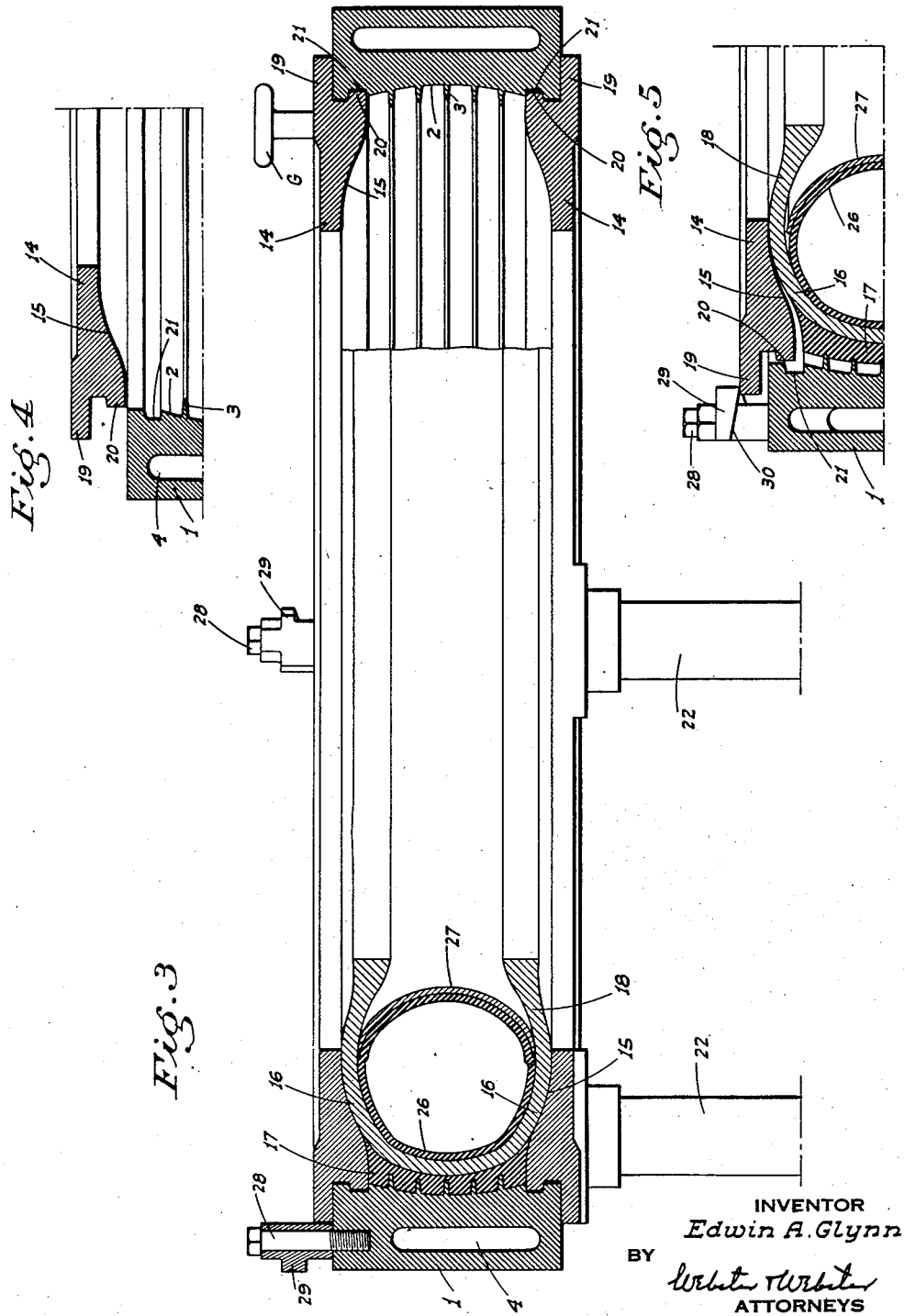
INVENTOR
Edwin A. Glynn
BY
ATTORNEYS Patented Mar. 6, 1945

2,370,655

UNITED STATES PATENT OFFICE 2,370,655

TREAD VULCANIZING MOLD FOR TIRES

Edwin A. Glynn, Lodi, Calif., assignor to Super Mold Corporation of California, Lodi, Calif., a corporation of California Application March 9, 1943, Serial No. 478,502

13 Claims. (Cl. 18—18)

This invention is in the art of tire conditioning or repair, and in particular the invention resides in the provision of an improved tread vulcanizing mold for tires, and especially a mold for use to accomplish what is known to the trade as full retreading, full capping, or top capping of tires from which the original tread has been substantially worn. These processes will hereinafter be termed generally "tread vulcanizing."

In recent years there has been a decided tendency on the part of new tire manufacturers to reduce the manufacture of new tires to a lesser number of tire sizes; that is, to standardize on a relative small number of tire sizes, of which the 600 x 16 size is most common. With such standardization of tire sizes, the present invention has for one of its objects the provision of a tread vulcanizing mold of unique design adapted to effectively accomplish tread vulcanizing of tires of one size only, which permits the mold to be relatively simple and inexpensive to manufacture and to be arranged so that it is convenient and economical to operate.

Another object of the present invention is to provide a tread vulcanizing mold for tires which includes, with an integral full-circle matrix forming body and steam chamber unit, a pair of initially separate retaining rings which form the opposite sides or skirts of the mold, and novel means removably securing said rings in connection with the matrix forming body; the rings, when the mold is in operation, being positively locked with said body and thus held against accidental escape axially of the mold.

A still further object of the present invention is to provide a tread vulcanizing mold, as in the preceding paragraph, in which the full-circle matrix forming body is split through radially at one point in its circumference; the body being constructed so that it tends to contract and bring the ends adjacent said split together, and means connected with the matrix forming body on opposite sides of said split operative to expand said split body whereby to increase the internal diameter of the body and the matrix formed thereby. The retaining rings normally project into the body from opposite sides thereof and each ring is formed with an outwardly projecting annular locking lip which seats in a matching relation in a corresponding annular groove in the inner periphery of said body when the latter is contracted, but which lip can escape from the corresponding groove when the body is expanded and its inside diameter increased, whereby at least one of said rings can be freed and removed from the body for placement of a tire in the mold for tread vulcanization, or removal of a tire from the mold after the vulcanizing process is completed.

An additional object of this invention is to provide a tread vulcanizing mold, as above, in which each of said retaining rings includes an annular, radially outwardly projecting stop flange which extends from the periphery of the ring adjacent its axially outermost face, and which flange seats against the corresponding side of the matrix forming body when the ring is in place in the body, whereby to limit the extent of projection of the ring into the body and to properly locate the locking lip relative to the corresponding lip receiving groove in the body, so that when the body is contracted the lips automatically seat in said grooves.

It is also an object of this invention to provide a tread vulcanizing mold, including a full-circle matrix forming body and initially separate retaining rings as described, in which the body is disposed with its axis horizontal, and wherein the stop flange of the lowermost retaining ring serves additionally as a leg supported bed for said body.

Another object is to provide a tread vulcanizing mold, of the type described, which includes a simple and yet novel cam nut arrangement which is used to urge one of the retaining rings into place in the event that the tire which is placed in the mold for vulcanizing is slightly oversize, as sometimes results from use thereof.

These objects I accomplish by means of such structure and relative arrangement of parts as will fully appear by a perusal of the following specification and claims.

In the drawings similar characters of reference indicate corresponding parts in the several views:

Figure 3 is an enlarged sectional elevation on line 3—3 of Fig. 2.

Figure 4 is an enlarged fragmentary cross section illustrating one of the retaining rings adjacent but separated from the matrix forming body.

Figure 5 is an enlarged fragmentary cross section illustrating the manner of use of one of the cam nuts which are employed to urge one of the retaining rings into place.

The improved tread vulcanizing mold comprises a horizontally disposed full-circle body 1, the inner peripheral face of said body being formed as a tire tread engaging and vulcanizing matrix 2 which includes radially inwardly projecting ribs or elements 3 of any suitable design, which form the anti-skid pattern in the tire tread. About substantially its entire circumference the body is formed with an internal steam chamber 4, which functions to heat the matrix.

Figure 2:
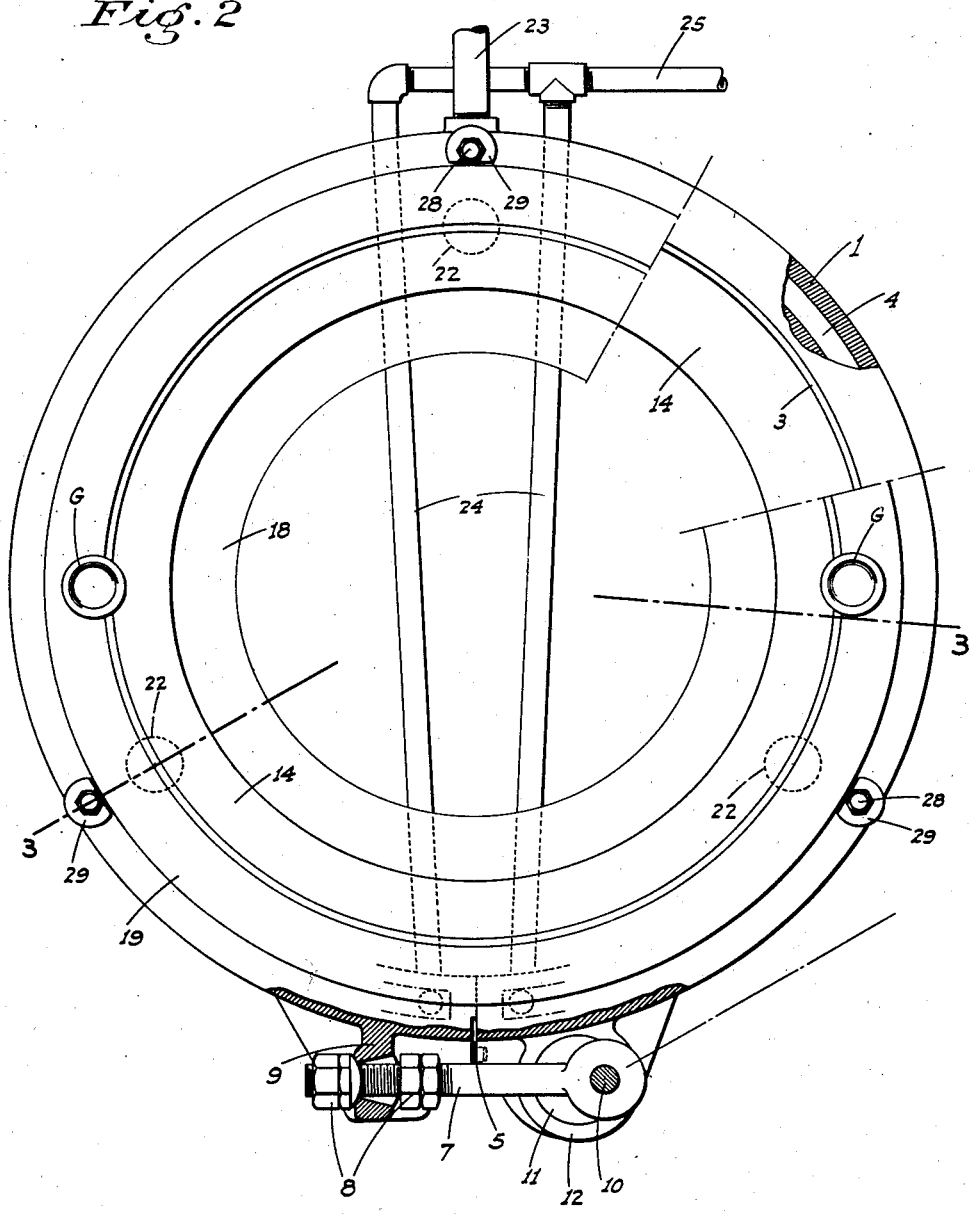
Figure 2 is a plan view of the improved mold showing the split, matrix forming body contracted.

The body 1, while of full-circle configuration, is split through radially at one point in its circumference, as at 5; such split body being formed so that it tends to contract and bring the body ends 6 into engaged relationship, as shown in Fig. 2.

Figure 1:
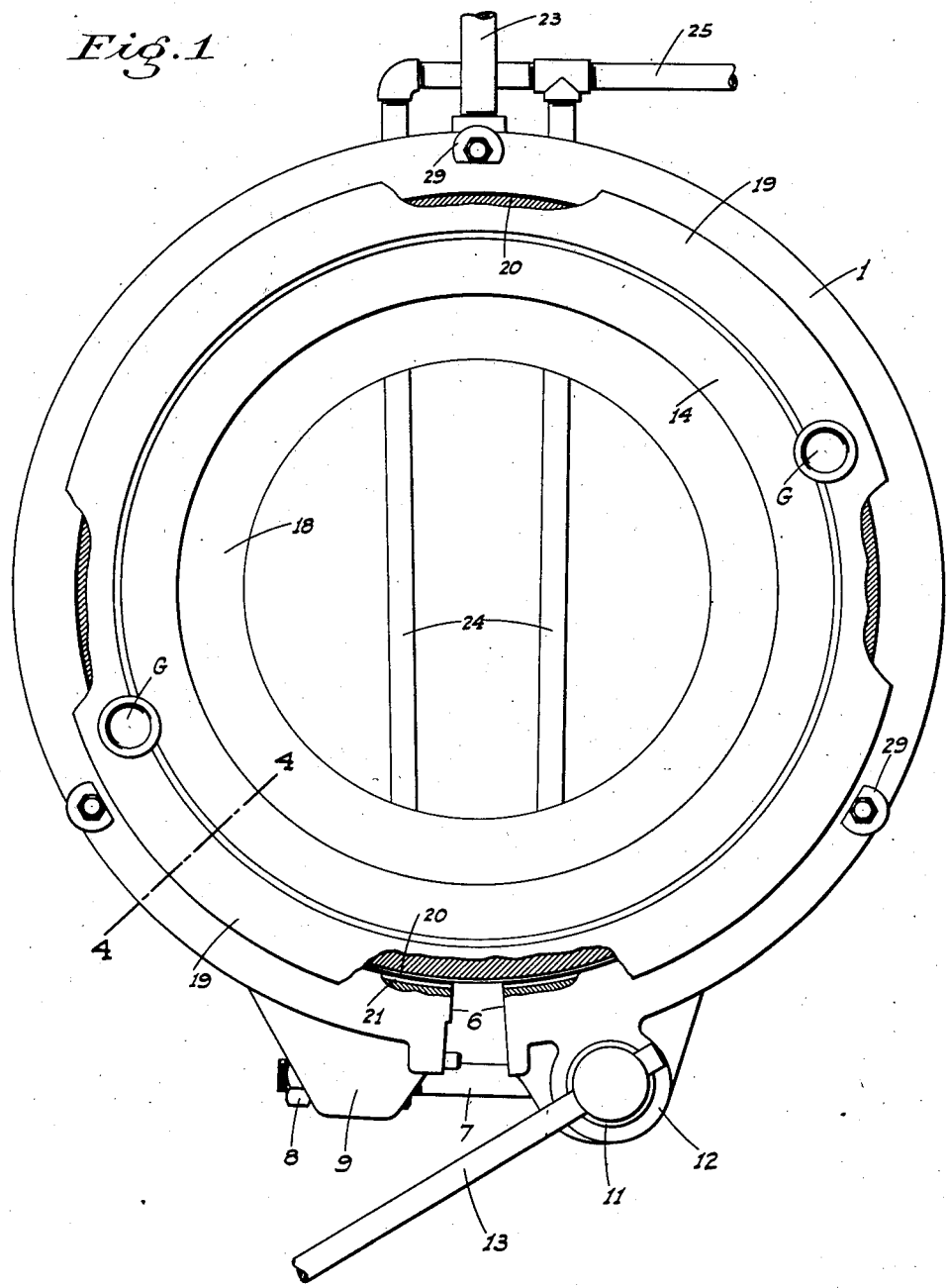
Figure 1 is a plan view of the improved mold showing the split, matrix forming body expanded.

An expansion and contraction control link 7 is disposed substantially tangent to the body 1 in intersecting relation to the split 5; one end of the link 7 being secured by nuts 8 through an ear 9 which projects horizontally outwardly from the body on one side of the split 5, while the other end of the link 7 is eccentrically pivoted as at 10 to a rotary cam 11 mounted in a pair of vertically spaced ears 12 which project from the mold adjacent but on the other side of the split 5. A radial actuating lever or handle 13 is secured in connection with the cam 11 whereby to rotate the same. It will be seen that with proper manipulation of the handle 13, the cam 11 will actuate the link 7 to diametrally expand the mold 1 as shown in Fig. 1, or to permit diametral contraction of the mold as shown in Fig. 2. The body 1 is formed so that when so expanded, as in Fig. 1, it not only increases in internal diameter but tends to retain a configuration with its inside periphery substantially circular.

A pair of initially separate retaining rings 14 form the opposite sides or skirts of the mold, and each such ring is constructed and mounted in the following manner:

The rings project into the body 1 from opposite sides thereof, the extent of such projection being mechanically limited, as will appear, and the axially innermost faces 15 of the rings being shaped as skirts which symmetrically conform to and retain the sidewalls 16 and the side edge or shoulder of the tread 17 of a tire 18 disposed in the mold. Each ring adjacent its axially outermost face is formed with a radially outwardly projecting stop flange 19 which overhangs and rests against the adjacent side of the body 1, regardless of whether the body is expanded or contracted. The maximum diameter of each ring 14 axially inwardly of the flange 19 is no greater than the internal diameter of the body 1 when the latter is expanded, whereby when the body is so expanded the ring may be placed in or removed from said body without obstruction.

Axially inwardly of and spaced from the flange 19 each ring is formed with an annular radially outwardly projecting locking lip 20 which seats in a corresponding annular groove 21 formed in the inner periphery of the body adjacent but to the side of the matrix forming portion of the latter. In practice, the diameter of each ring 14 axially inwardly of the flange 19 will be such both at the lip 20 and between said lip and the flange 19 that there will be a slight clearance with the corresponding body portions, whereby to assure against binding of the rings in the body upon maximum contraction of the latter.

The body 1 normally rests on the stop flange 19 of the lowermost retaining ring 14, this ring being supported above floor level by a plurality of legs 22 secured on and depending from said retaining ring.

Steam pressure is supplied to the steam chamber 4 in body 1 by means of a horizontal supply pipe 23 which connects with the steam chamber at a point on the body opposite the split 5, and a pair of horizontal discharge pipes 24 connect with the steam chamber on the lower side of the body adjacent but on opposite sides of said split. The pipes 24 extend fully across the mold to connection by suitable fittings with a return conduit 25. By mounting the pipes 24 as shown and as the same are relatively long, their resiliency permits diametral expansion and contraction of the body 1 without injury to said pipes or the fittings connecting the same with the mold. Steam supply and discharge from the mold is controlled by suitable valves (not shown) interposed in conduits 23 and 25.

Operation

In use, the above described tread vulcanizing mold is operated as follows:

The lever 13 is manipulated to expand the body 1 whereupon the uppermost retaining ring 14 is withdrawn from the mold by means of hand grips G. Thereafter the tire on which new tread material has previously been fixed is placed in the mold resting on the lowermost retaining ring 14. The uppermost retaining ring 14 is then dropped into place and the body 1 contracted, resulting in the locking lips 20 of the respective retaining rings seating in locking relation in corresponding grooves 21, positively preventing axial escape of the retaining rings relative to the body 1 during subsequent operation of the mold.

Thereafter a conventional air bag 26, and a conventional curing rim 27, which have previously been mounted in connection with the tire, are brought into play by inflation of the air bag 26 through the valve thereof to a predetermined pressure. As the retaining rings symmetrically engage the sidewalls 16 of the tire, as well as the sides or shoulders of the newly applied tread material, the tread 17 is forcefully urged by the pressure of the air bag into engagement with the matrix 2 during the following vulcanizing or curing period. During this period steam flows through chamber 4 heating matrix 2 to vulcanizing temperature.

After the curing period, the above described steps are carried out in reverse. When the ring 14 has been removed from the body the tire is pulled away from the matrix and drawn upwardly and out of the body.

The stop flanges 19 serve a dual function as they not only limit projection of the rings into the mold whereby to aline the lips with the grooves 21, but said flanges by reason of their abutment in face to face relation with the sides of the mold, stabilize the rings and greatly increase their resistance to the force exerted axially of the mold by the air bag 26 when inflated.

In the event that the tire 18 is found to be slightly oversize when initially placed in the mold, and which condition would prevent the easy placement of the uppermost retaining ring 14 in the body 1 with its flange 19 in proper engagement with said body, the following means is provided to urge said ring inwardly to correct position:

A plurality of vertical bolts 28 are threaded into a top side of the body 1 in symmetrical, circumferentially spaced relation and at points laterally out from the flange 19 of the adjacent ring 14. A cam nut 29 is turnably mounted on each bolt 28 between the head of the latter and the body 1, the cam surface 30 of each cam nut being disposed and shaped to ride the top surface of flange 19. Thus, the cam nuts 29, when engaged with the flange 19 and rotated in proper direction with a wrench or the like, cause the uppermost retaining ring 14 to be forcefully shifted downwardly in compressing relation to the tire and to position said ring correctly before the expanded body 1 is contracted to lock said ring in place.

While the present embodiment of the invention illustrates both rings 14 as being initially separate, removable from the body and employing the unique locking arrangement, it is apparent that under some conditions the lowermost ring 14 may be non-removably mounted, or may be formed as a split and integral part of the body. In any event, however, at least one ring must be initially separate and removably mounted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tread vulcanizing mold including a full-circle body having a matrix therein, said body being split through radially at one point in its circumference and having matrix heating means associated therewith, means to control diametral expansion and contraction of said split body, separate retaining rings projecting partially into the body on opposite sides of the matrix, an annular stop flange projecting radially outwardly from each ring in overhanging engagement with the corresponding side of the body whereby to limit projection of the rings into said body, and means functioning upon contraction of the body to lock said rings in the body against axial escape.

2. A tread vulcanizing mold including a full-circle body having a matrix therein, said body being split through radially at one point in its circumference and having matrix heating means associated therewith, means to control diametral expansion and contraction of said split body, separate retaining rings projecting partially into the body on opposite sides of the matrix, an annular stop flange projecting radially outwardly from each ring in overhanging engagement with the corresponding side of the body whereby to limit projection of the rings into said body, and an annular lip projecting radially outwardly from each ring in spaced relation to the corresponding flange, the body having an endless groove in which each lip seats when the body is contracted whereby to then prevent axial escape of said rings.

3. A tread vulcanizing mold as in claim 2 in which said flanges engage the sides of the body both when the latter is contracted or expanded; said lips being of limited radial extent whereby the same are removable from the grooves when the body is expanded.

4. A tread vulcanizing mold including a full-circle body having a matrix therein, said body being split radially through at one point in its circumference and having matrix heating means associated therewith, means to control diametral expansion and contraction of the body, tire side wall engaging skirts extending radially inwardly from the body on opposite sides of said matrix, at least one of said skirts being an initially separate ring projecting into the body from one side thereof, an annular stop flange projecting radially outwardly from the ring in overhanging engagement with the corresponding side of the body whereby to limit projection of the ring into the body, and means functioning upon contraction of the body to lock said ring against axial escape.

5. A tread vulcanizing mold including a full-circle body having a matrix therein, said body being split radially through at one point in its circumference and having matrix heating means associated therewith, means to control diametral expansion and contraction of the body, tire side wall engaging skirts extending radially inwardly from the body on opposite sides of said matrix, at least one of said skirts being an initially separate ring projecting into the body from one side thereof, an annular stop flange projecting radially outwardly from the ring in overhanging engagement with the corresponding side of the body whereby to limit projection of the ring into the body, and an annular lip projecting radially outwardly from the ring in spaced relation to the flange, the body having an endless groove in which the lip seats when the body is contracted whereby to then prevent axial escape of said ring.

6. A tread vulcanizing mold including a full-circle body having a matrix therein, said body being split radially through at one point in its circumference and having matrix heating means associated therewith, means to control diametral expansion and contraction of the body, tire side wall engaging skirts extending radially inwardly from the body on opposite sides of said matrix, at least one of said skirts being an initially separate ring projecting into the body from one side thereof, and means between said ring and the body arranged to lock said ring against axial escape from the body when the ring projects a predetermined extent into the body and when the latter is contracted, and means mounted in connection with the body and engaging said ring to urge the latter axially inwardly to said predetermined extent; said last named means comprising a plurality of circumferentially spaced cam nuts turnably mounted on the body and engageable with said ring on the outside.

7. A tread vulcanizing mold including a resilient full-circle body having a matrix therein, said body being split through radially at one point only in its circumference, matrix heating means associated with the body, means to control diametral expansion and contraction of said split body, separate retaining rings projecting into the body on opposite sides of the matrix, said rings including tire sidewall engaging skirts, a lip projecting radially outwardly from each of the rings, the body having a corresponding groove in which said lip seats when the body is contracted, said lip being of such radial extent that it can be freed from the groove only when the body is expanded to a certain extent, and an annular stop flange projecting radially outwardly from each ring, each flange engaging the adjacent side of the body whereby to limit axial projection of the corresponding ring into the body and to position said lip for groove engagement.

8. A tread vulcanizing mold including a full-circle body having a matrix therein, said body being split radially through at one point in its circumference and having matrix heating means associated therewith, means to control diametral expansion and contraction of the body, tire sidewall engaging skirts extending radially inwardly from the body on opposite sides of said matrix, at least one of said skirts being an initially separate ring projecting into the body from one side thereof, and stop means projecting outwardly from said ring in overhanging engagement with the corresponding side of the body whereby to limit projection of the ring into the body, and means functioning upon contraction of the body to lock said ring against axial escape.

9. A tread vulcanizing mold as in claim 8 in which said stop means is adapted to engage said side of the body both when the latter is expanded or contracted.

10. A tread vulcanizing mold including a full-circle body having a matrix therein, said body being split radially through at one point in its circumference and having matrix heating means associated therewith, means to control diametral expansion and contraction of the body, tire sidewall engaging skirts extending radially inwardly from the body on opposite sides of said matrix, at least one of said skirts being an initially separate ring projecting into the body from one side thereof, stop means projecting outwardly from said ring in overhanging engagement with the corresponding side of the body whereby to limit projection of the ring into the body, and means functioning upon contraction of the body to lock said ring against axial escape; there being means mounted in connection with the body adapted to engage said ring and urge the latter axially inwardly to said limit of projection into the body.

11. A tread vulcanizing mold including a full-circle body having a matrix therein, said body being split through radially at one point in its circumference and having matrix heating means associated therewith, means to control the diametral expansion and contraction of the body, separate retaining rings projecting into the body on opposite sides of the matrix, said rings including tire sidewall engaging skirts, means between the rings and body functioning to lock said rings against axial escape when the body is contracted, and stop means projecting outwardly from said rings in overhanging engagement with corresponding sides of the body whereby to limit projection of the rings into said body.

12. A tread vulcanizing mold as in claim 5 in which the lip is of slightly lesser diameter than the bottom diameter of the endless groove when the body is contracted and the split fully closed, whereby to permit of said full closing of the body without binding on the lip.

13. A tread vulcanizing mold including a full circle body having a matrix therein, said body being split radially through at one point in its circumference, matrix heating means associated with the body, means to control diametral expansion and contraction of the body, tire sidewall engaging skirts extending inwardly from the body on opposite sides of said matrix, at least one of said skirts being an initially separate ring projecting into the body from one side thereof, means between said ring and the body arranged to lock said ring against axial escape from the body when the latter is contracted; said last named means comprising a lip projecting radially outward from the ring, the body having a corresponding groove in which the lip seats when the body is contracted, said lip being of such radial extent that it can be freed from the groove only when the body is expanded to a certain extent, said ring including an annular stop flange projecting radially outward therefrom, said flange overlapping and engaging the corresponding side of the body whereby to limit axial projection of the ring into the body and to position said lip for groove engagement.

EDWIN A. GLYNN.